United States Patent
Yamaguchi et al.

[11] Patent Number: 6,035,601
[45] Date of Patent: Mar. 14, 2000

[54] MOUNTING STRUCTURE FOR ASSEMBLING DOOR COMPONENTS OF VEHICLE

[75] Inventors: Atsuyoshi Yamaguchi; Shinichi Okamoto, both of Shizuoka-ken, Japan

[73] Assignee: Yazaki Corporation, Tokyo, Japan

[21] Appl. No.: 08/770,776

[22] Filed: Dec. 20, 1996

[30] Foreign Application Priority Data

Dec. 21, 1995 [JP] Japan ................................ P 7-333642

[51] Int. Cl.[7] ....................................................... B60J 5/04
[52] U.S. Cl. ...................................... 52/784.16; 296/146.5
[58] Field of Search ............................. 52/784.1, 784.16; 296/190.11, 202, 146.2, 146.5, 146.6, 146.7

[56] References Cited

FOREIGN PATENT DOCUMENTS 2-296534  12/1990  Japan .

*Primary Examiner*—Michael Safav
*Attorney, Agent, or Firm*—Finnegan, Henderson, Farabow, Garrett & Dunner, L.L.P.

[57] ABSTRACT

A mounting structure for assembling door components of a vehicle includes an outer panel and an inner panel for closing an opening of the outer panel. The outer panel has upper, lower, left and right engagement parts arranged adjacent to an inner edge of the opening. The inner panel has movable upper, left and right clamping members for engagement with the upper, left and right engagement parts, respectively. By manipulating a pair of handles associated with the clamping members, the inner panel can be assembled to the outer panel by the engagement of the clamping members with the corresponding engagement parts.

10 Claims, 7 Drawing Sheets

MOUNTING STRUCTURE FOR ASSEMBLING DOOR COMPONENTS OF VEHICLE

BACKGROUND OF THE INVENTION

The present invention relates to a mounting structure for assembling door components of a vehicle, such as an automobile. Japanese Examined Patent Publication (Kokai) No. 2-296534 discloses a conventional mounting structure for assembling door components of an automobile to a door body. In the publication, a door frame of the vehicle door is composed of an outer panel and an inner panel. As to the inner panel, a wire harness for door is arranged in a manner that a terminal connector is fixed on a surface of the inner panel. Additionally, an electrical installation, such as a curtsy lamp, is connected to the terminal connector and fixed on the outside of the inner panel temporarily, while another installation, such as a door opening unit, is assembled on the inside of the inner panel, providing an inner panel assembly.

In assembling, the above inner panel assembly is assembled to the outer panel by means of a plurality of male screws and thereafter, a door trim is overlaid on the inner panel assembly. Therefore, according to the above-mentioned conventional mounting structure, owing to assembling of the inner panel in the form of a module, a workability in assembling a variety of electrical installations, the door wire harness etc. to the vehicle door has been progressed to enhance the productivity.

In the above-mentioned form to fastening the inner panel assembly through the intermediary of the plural male screws, however, there is a limit to improve the whole assembling workability because of a large number of male screws. Furthermore, since an insecure fastening of any male screws would cause an imperfect assembling of the inner panel assembly, there is a limit to improve the assembling reliability, too.

SUMMARY OF THE INVENTION

It is therefore an object of the present invention to provide a mounting structure for assembling door components of a vehicle, which is capable of improving both of workability and reliability in assembling the door components in the form of modules.

The object of the present invention described above can be accomplished by a mounting structure for assembling door components of a vehicle, comprising, in combination:

an outer panel which is shaped to be an elongated box having an opening, the outer panel including upper, lower, left and right engagement parts which are arranged adjacent to an inner edge of the opening and inside the elongated box;

an inner panel for closing the opening of the outer panel, the inner panel being in form of a plate;

upper and lower clamping members arranged on an inside surface of the inner panel for respective engagement with the upper and lower engagement parts inside of the outer panel, at least either one of the upper and lower clamping members being movably carried on the inner panel so that the movable clamping member is engageable with and disengageable from the upper or lower engagement part;

left and right clamping members arranged on an inside surface of the inner panel for engagement with the left and right engagement parts respectively, inside of the outer panel, at least either one of the left and right clamping members being movably carried on the inner panel so that the movable clamping member is engageable with and disengageable from the left or right engagement part;

handling means for handling the movable clamping members of the upper, lower, left and right clamping members, the handling means being arranged on an outside surface of the inner panel; and associating members for associating manipulations of the handling means with the movable clamping members respectively, whereby the movable clamping members can be engaged with and disengaged from the engagement parts.

In the present invention, in order to attach the assembled inner panel on the outer panel, the movable clamping members are moved by manipulating the handling means through the associating members from its disengaged condition to the engaged condition. Consequently, the movable clamping members are engaged with the corresponding engagement parts, so that the assemble inner panel can be fixed to the outer panel.

With the arrangement mentioned above, it is possible to improve the assembling workability remarkably. In addition, it is possible to reduce the numbers of the engagement parts and the handling means, so that the assembling reliability can be improved.

In the present invention, preferably, the upper and lower engagement parts comprises upper and lower holding members having insert ports directing upward and downward respectively, while the left and right engagement parts comprises left and right holding members having insertion ports directing to the right and left hands, respectively.

In this case, when the movable clamping members are moved by manipulating the handling means through the associating members from the disengaged condition to the engaged condition, the movable clamping members are inserted into the insert ports of the corresponding holding members, so that the assemble inner panel can be fixed to the outer panel.

Also in this case, it is possible to improve the assembling workability remarkably. In addition, it is possible to reduce the numbers of the engagement parts and the handling means, so that the assembling reliability can be improved.

It is more preferable that the mounting structure of the invention further comprises guide members fixed on the inside face of the inner panel for guiding movements of the movable clamping members; the movable clamping members are carried on the inner panel so as to slide with respect to the guide members; the handling means comprises a spindle rotatably supported by the inner panel and a handle fixed to an end of the spindle and arranged in the vicinity of the outside surface of the inner panel; and that each of the associating members comprises a cam fixed on the other end of the spindle to abut on an end of each of the movable clamping members.

In operation, when the cam is rotated by rotating the handle through the spindle, the movable clamping member is inserted into the holding member to fix the assemble inner panel to the outer panel. Accordingly, with such a simple structure, it is possible to improve the workability and reliability in assembling the inner panel to the outer panel certainly.

It is more preferable that the mounting structure further comprises spindle urging means for urging the spindle axially to the side of the outside surface of the inner panel; the spindle is carried by the inner panel so as to shift axially to the side of the inside surface of the inner panel; the cam is provided, on a surface thereof opposing the inside surface of the inner panel, with a recess; and that the inner panel is provided, on the inside surface, with at least one projection which is engageable with the recess.

Since the spindle is urged by the urging means, the rotation of the spindle can be locked by an engagement of the projection with the recess. In this condition, since the handle is fixed with respect to the inner panel, it is possible for a worker to deal with the assembled inner panel freely by carrying the handle by his hand, so that the workability is improved remarkably.

In the present invention, more preferably, the inner panel is provided, on the inside surface, with a plurality of projections which are engageable with the recess. With the respective engagement of the projections with the recess, each of the movable clamping members can occupy at least two fixed positions where the each clamping member is engaged with and disengaged from the holding member. This means that it is possible to fix the handle at least two positions. Therefore, through the intermediary of the fixed handles, the handling of the assembled inner panel can be facilitated thereby to maintain the inner panel to be fixed to the outer panel certainly.

Alternatively, it is preferable that the cam is provided, on a surface thereof opposing the inside surface of the inner panel, with a projection, while the inner panel is provided, on the inside surface, with at least one recess which is engageable with the projection. Also in this case, since the spindle is urged by the urging means, the rotation of the spindle can be locked by the engagement of the projection with the recess. Under such a circumstance, since the handle is fixed with respect to the inner panel, it is possible for a worker to deal with the assembled inner panel freely by carrying the handle by his hand, so that the workability is improved remarkably.

More preferably, the inner panel is provided, on the inside surface, with a plurality of recesses which are engageable with the projection. With the respective engagement of the recesses with the projection, each of the movable clamping members can occupy at least two fixed positions where the each clamping member is engaged with and disengaged from the holding member. This means that it is possible to fix the handle at least two positions. Therefore, through the intermediary of the fixed handles, the handling of the assembled inner panel can be facilitated thereby to maintain the inner panel to be fixed to the outer panel certainly.

In the present invention, it is preferable that the mounting structure further comprises clamp urging means for urging each of the movable clamping members to a direction to disengage from the engagement part.

In operation, when removing the inner panel from the outer panel, the movable clamping member can be returned to the disengaging position automatically, so that an operation to detach the inner panel from the outer panel can be facilitated.

Finally, it is preferable that the upper clamping member is movably carried on the inner panel while the lower clamping member is fixed on the inner panel; the upper clamping member is arranged adjacent to at least either movable one of the left and right clamping members; and that the cam comes into contact with both of an end of the upper clamping member and an end of the movable one of the left and right clamping members.

With the arrangement mentioned above, when attaching the inner panel to the outer panel, the inner panel can be positioned properly by inserting the lower clamping member into the insert port of the lower holding member of the outer panel. Next, in case of rotating the handle while the inner panel is generally adjusted to the outer panel, the adjoining clamping members can be moved simultaneously to fit in the corresponding insert ports, so that the inner panel can be fixed on the outer panel. With the arrangement, it is possible to reduce the numbers of the handles, thereby improving the assembling workability and reliability of the inner panel to the outer panel.

These and other objects and features of the present invention will become more fully apparent from the following description and appended claims taken in conjunction with the accompany drawing.

BRIEF DESCRIPTION OF THE DRAWINGS

FIG. 5A is a perspective view of the form showing a relationship between the supported clamping member and a cam;

FIG. 5B is a perspective view of the clamping member cut-away partially;

FIG. 5C is a cross sectional view of the form;

FIG. 6A is a plan view showing a relationship between the cam and the clamping members;

FIG. 6B is a cross sectional view showing a process of mounting an inner panel assembly to the outer panel;

FIG. 6C is a cross sectional view showing the inner panel assembly mounted to the outer panel;

FIG. 7A is a plan view showing a relationship between the cam and the clamping members; and FIG. 7B is a cross sectional view of the mounting structure in which the inner panel assembly is secured to the outer panel.

DESCRIPTION OF THE PREFERRED EMBODIMENT

An embodiment of the present invention will be described with reference to the drawings.

Figure 1:
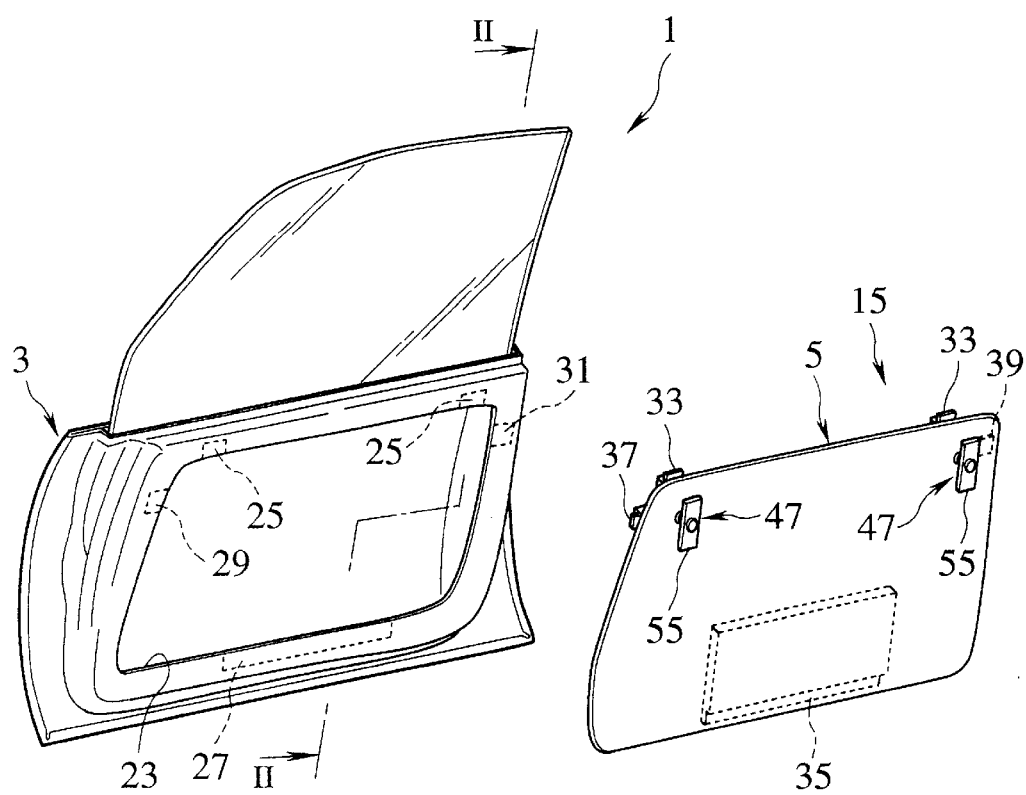
FIG. 1 is an exploded perspective view of a mounting structure for door components of a vehicle, in accordance with an embodiment of the present invention.
Figure 2:
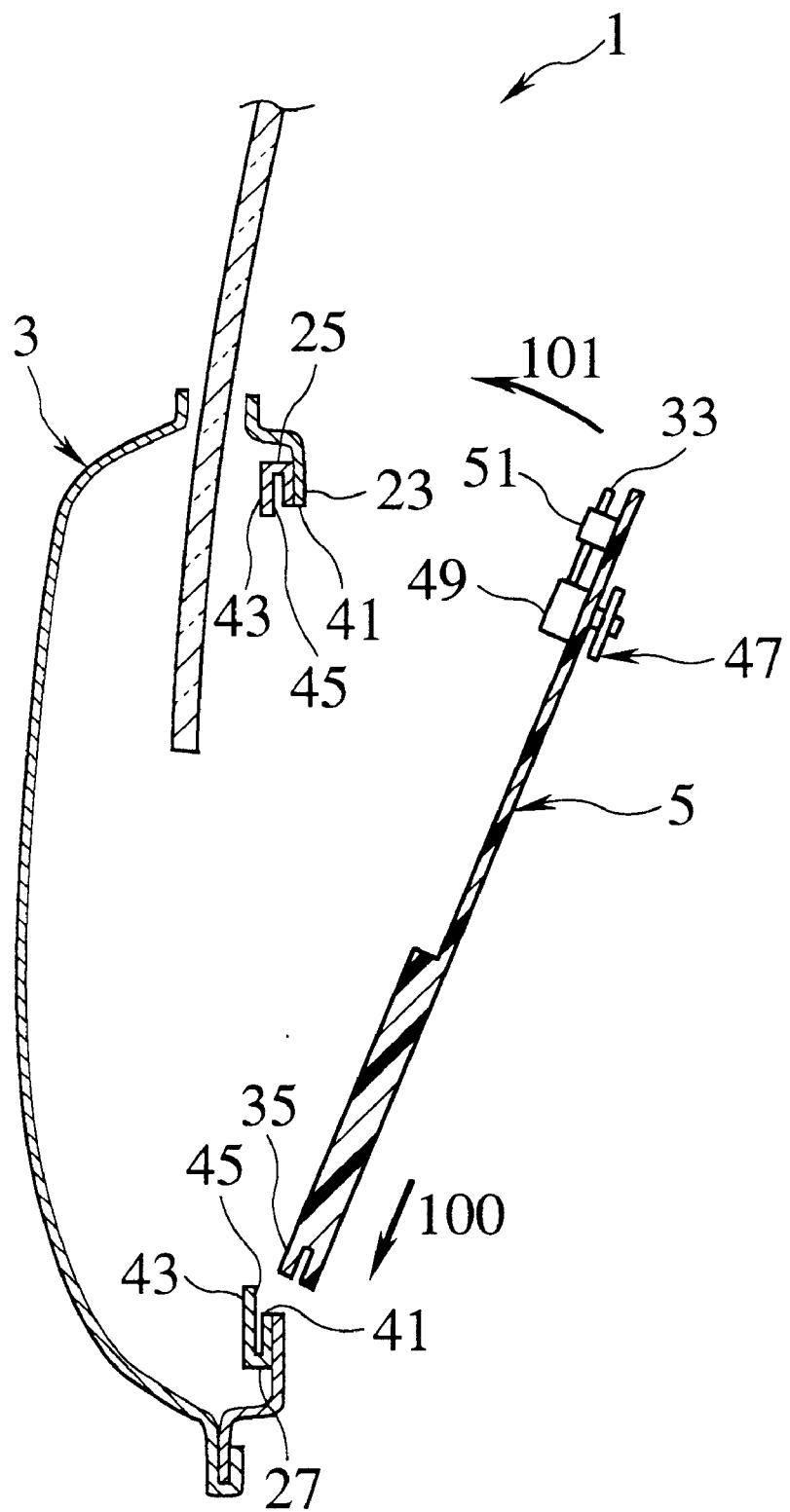
FIG. 2 is a cross sectional view of the mounting structure, taken along a line II—II of FIG. 1.

As shown in FIGS. 1 and 2, according to the embodiment, a vehicle door 1 consists of an outer panel 3 in the form of an elongated box and an inner panel 5 in the form of a plate. The outer panel 3 is provided with an rectangular opening 23 to be covered with the inner panel 5. On the other hand, the inner panel 5 is constituted by an inner panel assembly 15 in the form of one module. Similar to the conventional inner panel assembly, the inner panel assembly 15 includes some wire harnesses to be installed inside the vehicle door 1, connectors, a curtsy lamp, a door closing mechanism, a door trim etc., all of which are not shown in the figures.

For integration with the inner panel 5, the outer panel 3 is provided, around the opening 23, with a pair of upper holding members 25, a lower holding member 27, a left holding member 29 and a right holding member 31, all of which provide engagement parts of the invention. On the other hand, a pair of upper clamping members 33, 33, a lower clamping member 35, a left clamping member 37 and a right clamping member 39 (in FIG. 1) are disposed on an inside surface of the inner panel 15 to engage with the holding members 25, 25, 27, 29, 31, respectively.

On the upper edge defining the contour of the opening 23, the upper holding members 25, 25 are positioned close to the upper corners of the opening 23. Similarly, the left holding member 29 and the right holding member 31 are positioned on the side edges defining the contour of the opening 23. The lower holding member 27 is positioned at the center of the lower edge defining the contour of the opening 23. The lower holding member 27 is formed longer than any one of the upper holding member 25, the left holding member 29 and the right holding member 31. All of the holding members 25, 27, 29, 31 are formed to have cross sections substantially identical to each other. For example, as shown in FIG. 2, each of the holding members 25, 27 is composed of a wall 41 on the side of the opening 23, a secluded wall 43 formed longer than the wall 41 and an insert port 45 defined between the wall 41 and the opposite wall 43, providing a U-shaped cross section (see FIG. 2). In arrangement, the upper holding member 25 is arranged in a manner that the insert port 45 opens downwardly, while the lower holding member 25 is arranged so that the insert port 45 opens upwardly. Although the left holding member 29 and the right holding member 31 are not shown in FIG. 2, it will be understood that the former is arranged so that an insert port thereof opens to the right hand in FIG. 1, while the later is arranged so that an insert port thereof opens to the left hand. These holding members 29, 31 are so formed to have similar structure to that of the upper holding member 25.

As shown in FIGS. 1 and 2, the upper and lower clamping members 33, 35 and the left and right clamping members 37, 39 are provided on the inside surface of the inner panel 5. In arrangement, the upper clamping member 33 is arranged so as to direct upwardly while the lower clamping member 35 is directed downwardly, Similarly, the left clamping member 37 is directed to the left hand in FIG. 1, while the right clamping member 39 is directed to the right hand. On the inside surface of the inner panel 5, the upper clamping members 33, 33 are arranged adjacent to the left and right clamping members 37, 39 at upside corners of the panel 5, respectively.

According to the embodiment, the upper, right and left clamping members 33, 33, 37, 39 are supported so as to shift on the inner panel 5, providing movable clamping members. While, the lower clamping member 35 is formed integral with the inner panel 5, which is made of reinforced plastic material, such as FRP, providing an immovable clamp.

Corresponding to the lower holding member 27, the lower clamping member 35 is lengthened at a center of the lower edge of the inner panel 5.

The inner panel 5 is provided, on the outside surface, with handling members 47 for manipulating the movable clamping members 33, 33, 37, 39 on the side of the outside surface of the panel 5.

Further provided on the side of the inside surface of the inner panel 5 are two cams 49 which activate the movable clamping members 33, 33, 37, 39 in response to manipulation of the handling members 47. Consequently, the movable clamping members 33, 33, 37, 39 can engage with the insert ports 45 of the holding members 25, 25, 29, 31, respectively.

On either side of the left and right clamping members 37, 39, the handling members 47 and the cams 49 are constituted by structures identical to each other. Note, the cam 49 in cooperation with the upper and left clamping members 33, 37 is arranged in symmetry with the other cam 49 in cooperation with the upper and right clamping members 33, 39.

Figure 3:
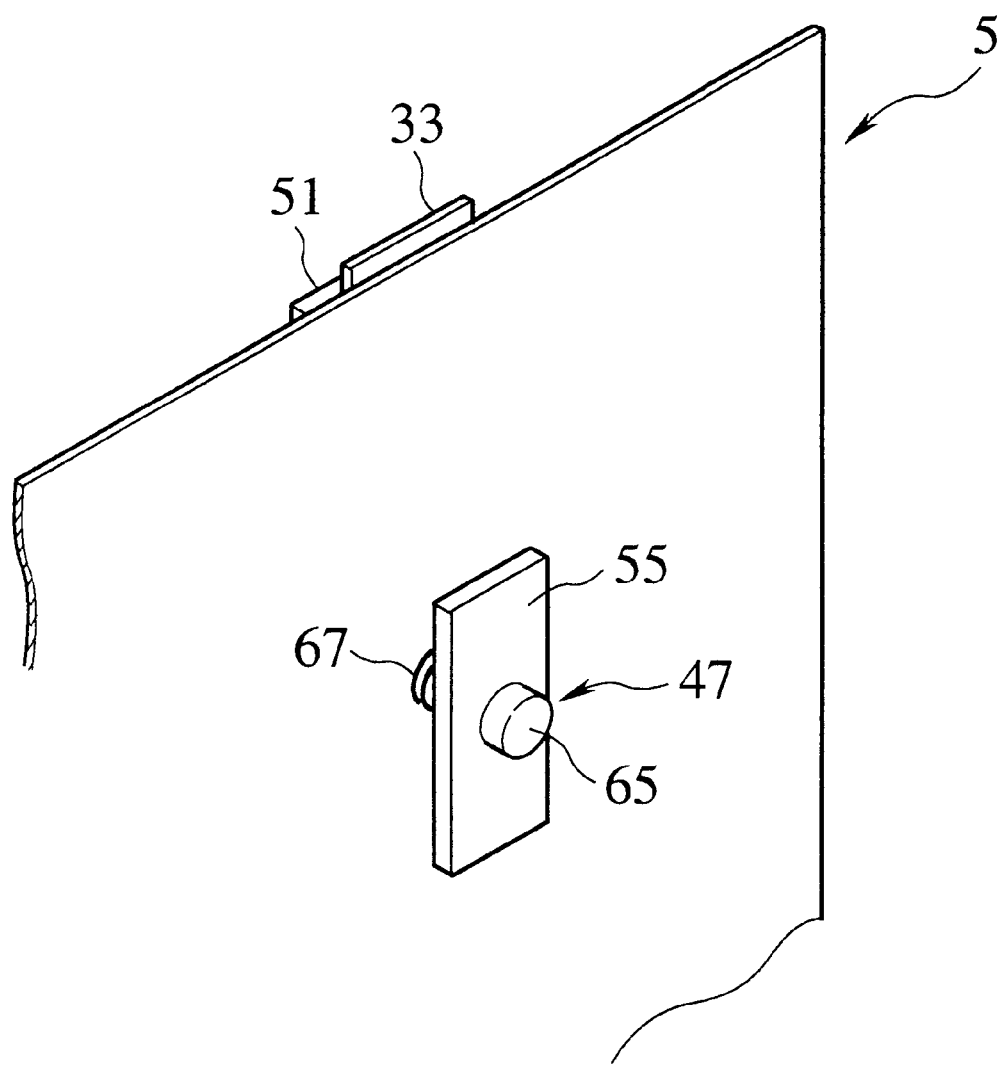
FIG. 3 is an enlarged perspective view of a part of an inner panel of the mounting structure.
Figure 4:
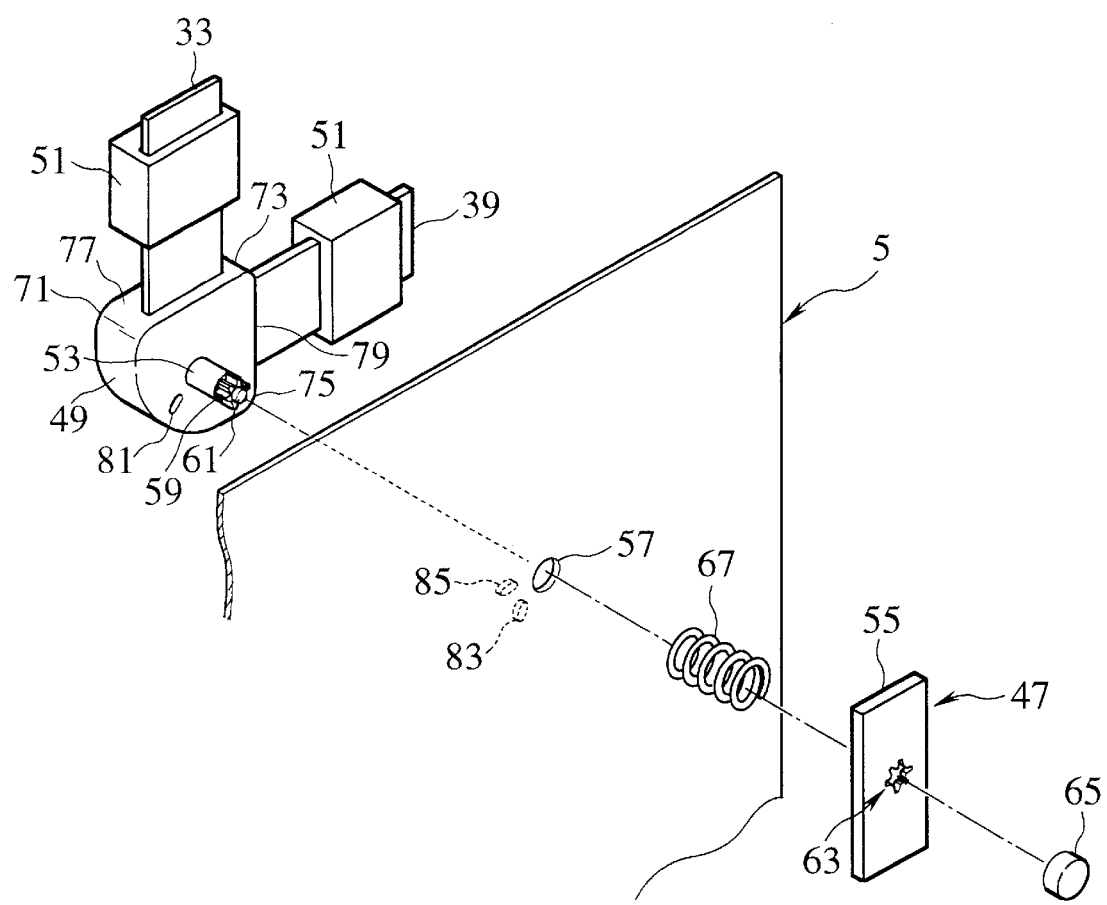
FIG. 4 is an enlarged and exploded perspective view of a part of the inner panel of FIG. 3.

We now describe the detailed structure of the handling member 47 with reference to FIGS. 3 to 5.

Figure 5A:
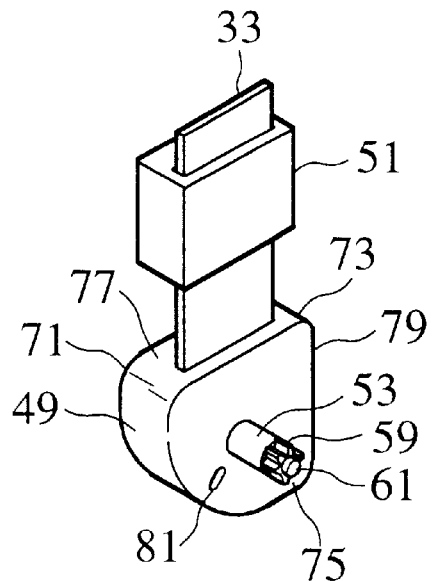
FIGS. 5A to 5C show a form of supporting a clamping member.

FIG. 3 shows an enlarged view of an upper area on the right side of the inner panel 5 representatively and FIG. 4 is a further enlarged and exploded perspective view of FIG. 3. In addition, while showing a relationship between the clamping member and the cam, FIG. 5A is a perspective view of the upper clamping member 33 and the cam 49, FIG. 5B a perspective view of a structure for supporting the upper clamping member 33 where a part of the structure is cut away, and FIG. 5C is a cross sectional view of the structure.

As shown in these figures, the upper and right clamping members 33, 39 in the form of rectangular plates are supported by guide members 51 so as to slide or reciprocate therein. The guide members 33, 39 are fixed on the inside surface of the inner panel 5 by means of an adhesive agent. Alternatively, the guide members 33, 39 may be molded with the panel 5 in one body.

The handling member 47 consists of a spindle 53 and a handle 55. The spindle 53 is carried so as to rotate in a carrying hole 57 formed in the inner panel 5 and shift toward the inside surface of the panel 5 axially. Being supported on one end of the spindle 53, the handle 53 is positioned on the exterior side of the inner panel 5. As shown in FIG. 4, the spindle 54 is provided, on the end, with a gear portion 59 as whirl-stop and a male screw 61 for clamping. On the other hand, the handle 55 in the form of a rectangular plate has an internal gear 63 formed at the center. In assembly, the internal gear 63 of the handle 55 meshes with the gear portion 59 of the spindle 53, so that the handle 55 is joined to the spindle 53. The slipping-out of the handle 55 can be prevented by tightening a cap 65 having a female screw on the male screw 61. Arranged between the surface of the inner panel 5 and the handle 55 is a coil spring 67 which serves to urge the spindle 53 against the surface side of the inner panel 5.

The cam 49 in the side shape of a substantial fan has an axis part fitted to the other end of the spindle 53 and is arranged on the interior side of the inner panel 5. The cam 49 is provided with three peaks 71, 73, 75. The peaks 71 and 73 are arranged about the axis part to make a right angle with each other, providing the maximum lifts of the clamping members 33, 39. Formed between the peak 71 and the peak 73 and formed between the peak 73 and the peak 75 are respective surfaces 77 and 79 which provide the same lift with each other, including the base circle of the cum 49. In the state shown in FIG. 4, the surfaces 77, 79 abut on the ends of the clamping members 33, 39 at respective portions overlapping with the base circle of the cum 49.

The cam 49 has a recess 81 formed on the surface facing the inside face of the inner panel 5. While, the inner panel 5 is provided, on the inside face, with a first projection 83 and a second projection 85. The projections 83, 85 are disposed about the carrying hole 57 to make an angle of 45 degrees with each other. The so-constructed cam 49 is assembled to the inner panel 5 by engaging the first projection 83 with the recess 81 while the clamping members 33, 39 come into contact with the surfaces 77, 79 respectively, as shown in FIG. 4. Of course, the cam 49 can be provided with a projection in place of the recess with the panels appropriately having recesses to mate with the projection of the cam.

Figure 5B:
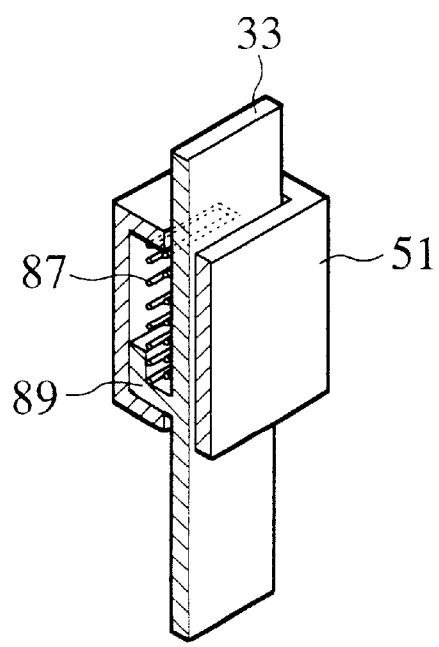
Figure 5C:
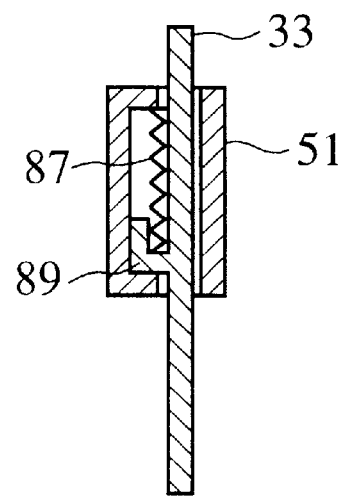

According to the embodiment, as shown in FIGS. 5B and 5C, a return spring 87 is provided for urging the movable clamping member 33 against the cam 49. The return spring 87 is accommodated in the guide member 51 between a receiving projection 89 and an inner wall of the member 51. In order to realize such an assembling of the spring 87, the guide member 51 may be composed of separable upper and lower elements which will be joined to each other adhesively. Additionally, providing that the guide member 51 and the inner panel 5 are molded in one body, it is preferable to form the guide member 51 so as to be separable partially. Even in such a case, the assembling of the spring 87 can be executed easily by adhering the separated part with the remaining guide member 51 after assembling the spring 47.

We now describe an assembling operation of the inner panel assembly 15.

According to the embodiment, the engagement of the recess 81 (FIG. 4) of the cam 49 with the first projection 83 allows the handle 55 to be locked from its rotation through the spindle 53. The inner panel 5 is provided, on both sides thereof, with a pair of handles 55 projecting from the surface of the panel 5. Therefore, even if the weight of the inner panel assembly 5 is increased because of prior assembling of parts, such as wire harnesses for doors, it is possible for a worker to handle the inner panel assembly 5 easily by his carrying both of the handles 55.

Figure 6A:
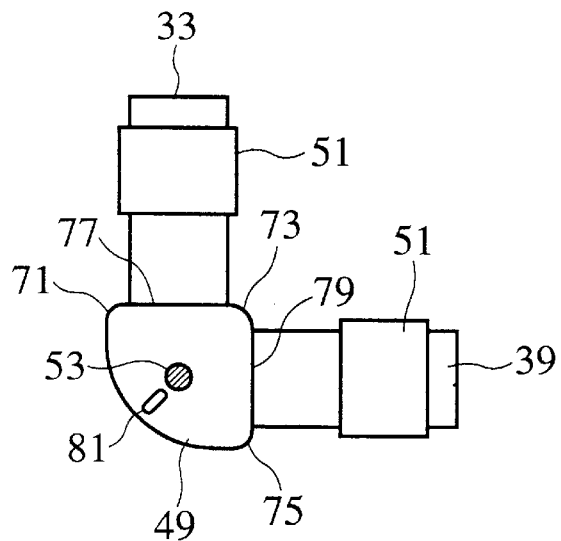
FIGS. 6A to 6C are explanatory operational views.

Then, as shown with an arrow 100 of FIG. 2, the lower clamping member 35 is inserted into the insertion port 45 of the lower holding member 27 the inner panel assembly 15, so that the assembly 15 can be arranged in position of the lower side of the opening 23. At this time, according to the embodiment, the movement of the lower clamping member 35 is guided by the holding wall 43 of the lower holding member 27 thereby to facilitate the inserting operation. In addition, since both of the lower holding member 27 and the lower clamping member 35 are long from side to side, the positioning of the inserted inner panel assembly 15 can be stabilized. Note, in this state, the cam 49 is under the condition of FIG. 6A.

Figure 6B:
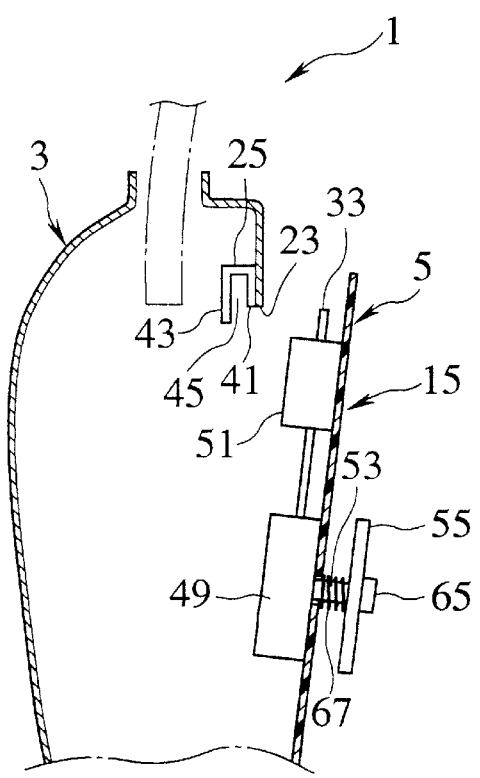
Figure 6C:
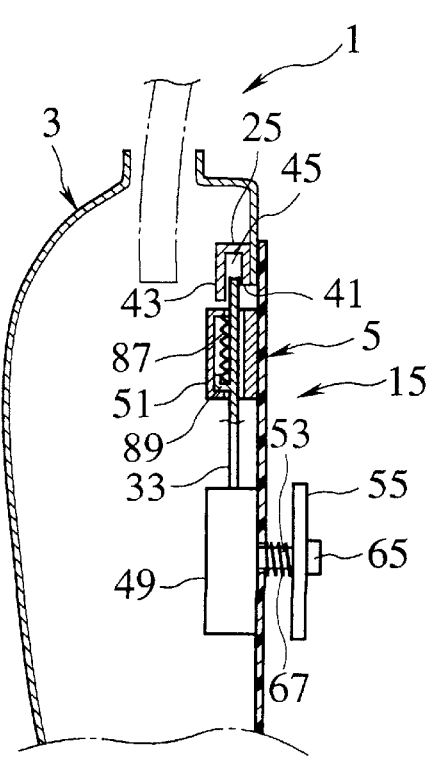

Next, by moving the upper section of the inner panel assembly 15 along an arrow 101 of FIG. 2, the inner panel assembly 15 is attached to the outer panel 3 to close the opening 23, as shown in FIGS. 6B to 6C.

Under such a circamstance, both of the handles 55 are then depressed against the inner panel 5. Consequently, due to this depression, the handles 55 and the spindles 53 are moved to the inside face side of the inner panel 5, opposing the urging force of the spring 67. This movement causes the recesses 81 of the cams 49 to be disengaged from the first projections 83, so that the spindle 53 can rotate freely.

Figure 7A:
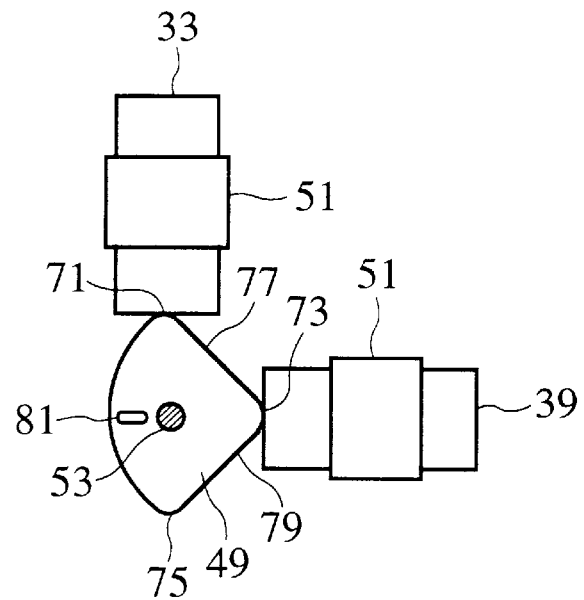
FIGS. 7A and 7B are explanatory operational views.
Figure 7B:
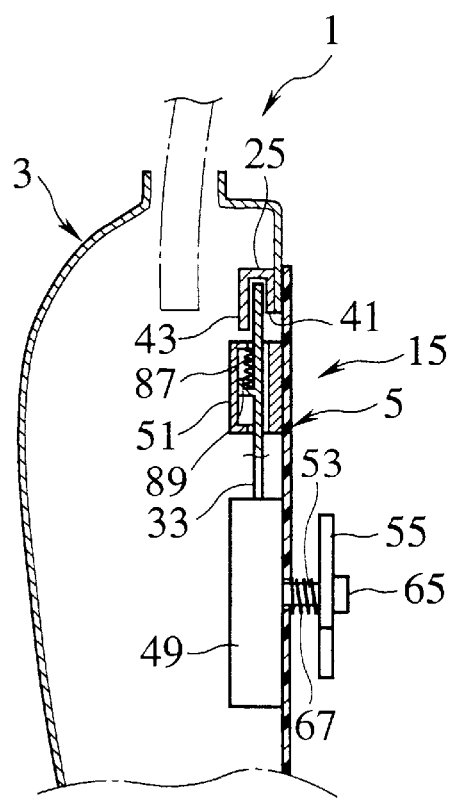

Under the above condition, the right handle 55 (in FIG. 1) is rotated in the clockwise direction by an angle of 45 degrees. Conversely, the left handle 55 is rotated in the counter-clockwise direction by an angle of 45 degrees. By the rotation, the peaks 71, 73 of the cam 49 are brought into contact with the ends of the upper and right (left) clamping members 33, 39 (37) to move them with respect to the guiding members 51, as shown in FIG. 7A. This movement allows the clamping members 33, 39 (37) to be inserted into the insert ports 45.

Next, when releasing the urging of the handle 55 against the inner panel 5, the handle 55 and the spindle 53 are shifted to project from the surface of the inner panel 5 by the spring 67, so that the recess 81 of the cam 49 is engaged and locked with the second projection 85 of the inner panel 5. Consequently, the handle 55 can be prevented from rotating and the clamping members 33, 39 (37) can be locked while they are inserted into the insert ports 45.

In this way, by inserting the clamping members 33, 35, 37, 39 into the respective holding members 25, 27, 29, 31, it is possible to assemble and fix the inner panel assembly 15 to the outer panel 3 easily. Further, owing to only manipulation of two handles 55, the workability in assembling the inner panel assembly 15 can be improved. Moreover, in order to detect whether the assembling has been carried out precisely, the worker has only to confirm the positions of two handles 55. Thus, the reliability in assembling can be further improved.

It is noted that the detaching of the inner panel assembly 15 from the outer panel 3 can be accomplished by executing the opposite manipulating steps of the handles 55 to the above-mentioned manipulation. When the cam 49 is rotated from a position of FIG. 7A to another position of FIG. 6A by the above converse manipulation, the clamping members 33, 39 (37) are forced back by the urging force of the return springs 87, so that the holding members 25, 29, 31 are disengaged from the insertion ports 45. Then, by changing the condition of the assembly 15 from FIG. 6C to FIG. 6B, it is possible to take it out of the outer panel 3 with ease, providing one of the most convenient structures in view of maintenance.

Finally, it will be understood by those skilled in the art that the foregoing description is one of preferred embodiments of the disclosed structure and that various changes and modifications may be made to the present invention without departing from the spirit and scope thereof.

What is claimed is:

1. A mounting structure for assembling door components of a vehicle, comprising:

an outer panel shaped to be an elongated box having an opening, said outer panel including upper, lower, left and right engagement parts arranged adjacent to an inner edge of said opening and inside said elongated box;

an inner panel for closing said opening of said outer panel, said inner panel being a plate;

upper and lower clamping members arranged on an inside surface of said inner panel for engaging said upper and lower engagement parts respectively, inside of said outer panel, at least one of said upper and lower clamping members being movably carried on said inner panel so that said one of the movable clamping members is engageable with and disengageable from one of said upper and lower engagement parts;

left and right clamping members arranged on the inside surface of said inner panel for engaging said left and right engagement parts respectively, inside of said outer panel, at least one of said left and right clamping members being movably carried on said inner panel so that said movable clamping member is engageable with and disengageable from said one of left and right engagement parts;

handling means for handling said movable clamping members of said upper, lower, left and right clamping members, said handling means being arranged on an outside surface of said inner panel; and associating members for associating manipulations of said handling means with said movable clamping members respectively, whereby said movable clamping members can be engaged with and disengaged from said engagement parts.

2. A mounting structure as claimed in claim 1, wherein said upper and lower engagement parts comprises upper and lower holding members having insert ports oriented downwardly and upwardly respectively, while said left and right engagement parts comprises left and right holding members having insertion ports oriented rightwardly and leftwardly, respectively.

3. A mounting structure as claimed in claim 1, further comprising guide members fixed on said inside face of said inner panel for guiding movements of said movable clamping members, wherein said movable clamping members are carried on said inner panel so as to slide with respect to said guide members;

said handling means comprises a spindle rotatably supported by said inner panel and a handle fixed to an end of said spindle; and each of said associating members comprises a cam fixed on the other end of said spindle to abut on an end of each of said movable clamping members.

4. A mounting structure as claimed in claim 3, further comprising spindle urging means for urging said spindle axially to the side of the outside surface of said inner panel, wherein said spindle is carried by said inner panel so as to shift axially to the side of the inside surface of said inner panel;

said cam is provided, on a surface thereof opposing said inside surface of said inner panel, with a recess; and said inner panel is provided, on said inside surface, with at least one projection which is engageable with said recess.

5. A mounting structure as claimed in claim 4, wherein said inner panel is provided, on said inside surface, with a plurality of projections which are engageable with said recess;

whereby each of said movable clamping members can occupy at least two fixed positions where said each clamping member is engaged with and disengaged from a holding member of said engagement parts.

6. A mounting structure as claimed in claim 3, further comprising spindle urging means for urging said spindle axially to the side of the outside surface of said inner panel, wherein said spindle is carried by said inner panel so as to shift axially to the side of the inside surface of said inner panel;

said cam is provided, on a surface thereof opposing said inside surface of said inner panel, with a projection; and said inner panel is provided, on said inside surface, with at least one recess which is engageable with said projection.

7. A mounting structure as claimed in claim 6, wherein said inner panel is provided, on said inside surface, with a plurality of recesses each of which is engageable with said projection;

whereby each of said movable clamping members can occupy at least two fixed positions where said each clamping member is engaged with and disengaged from a holding member of said engagement parts.

8. A mounting structure as claimed in claim 1, further comprising clamp urging means for urging each of said movable clamping members to a direction to disengage from said engagement part.

9. A mounting structure as claimed in claim 3, wherein said upper clamping member is movably carried on said inner panel while said lower clamping member is fixed on said inner panel;

said upper clamping member is arranged adjacent to the movable one of said left and right clamping members; and said cam comes into contact with both of an end of said upper clamping member and an end of said movable one of said left and right clamping members.

10. A mounting structure for assembling door components of a vehicle, comprising:

an outer panel formed as an elongated box having an opening defined by an inner edge, said outer panel including upper, lower, left and right engagement parts arranged adjacent to said inner edge;

an inner panel for closing said opening of said outer panel, said inner panel having an inside surface and an outside surface;

upper and lower clamping members arranged on the inside surface of said inner panel for engaging said upper and lower engagement parts respectively, at least one of said upper and lower clamping members being adjustably attached to said inner panel so that said one of the clamping members is engageable with and disengageable from one of said upper and lower engagement parts;

left and right clamping members arranged on the inside surface of said inner panel for engaging said left and right engagement parts respectively, at least one of said left and right clamping members being adjustably attached to said inner panel so that said movable clamping member is engageable with and disengageable from said one of left and right engagement parts;

handling means arranged on the outside surface of said inner panel for adjusting said upper, lower, left and right clamping members, and associating members coupled to said handling means and clamping members, for manipulating said clamping members to engage with and disengage from said engagement parts.

* * * * *

UNITED STATES PATENT AND TRADEMARK OFFICE
CERTIFICATE OF CORRECTION

PATENT NO. : 6,035,601
DATED : March 14, 2000
INVENTOR(S) : Atsuyoshi YAMAGUCHI et al.

It is certified that error appears in the above-identified patent and that said Letters Patent is hereby corrected as shown below:

Claim 2, column 9, line 4, "parts comprises" should read --parts comprise--.

Claim 2, column 9, line 6, after "upwardly", insert --,--.

Claim 2, column 9, line 7, "parts comprises" should read --parts comprise--.

Signed and Sealed this

Seventeenth Day of April, 2001

Attest:

NICHOLAS P. GODICI

Attesting Officer      Acting Director of the United States Patent and Trademark Office